United States Patent
Wu et al.

(10) Patent No.: US 11,796,796 B2
(45) Date of Patent: Oct. 24, 2023

(54) OFF-AXIS TWO-MIRROR INFRARED IMAGING SYSTEM

(71) Applicants: Tsinghua University, Beijing (CN); HON HAI PRECISION INDUSTRY CO., LTD., New Taipei (TW)

(72) Inventors: Wei-Chen Wu, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 338 days.

(21) Appl. No.: 17/337,224

(22) Filed: Jun. 2, 2021

(65) Prior Publication Data
US 2022/0050288 A1  Feb. 17, 2022

(30) Foreign Application Priority Data
Aug. 14, 2020 (CN) .......................... 202010818309.7

(51) Int. Cl.
*G02B 27/00* (2006.01)
*H04N 5/33* (2023.01)

(52) U.S. Cl.
CPC ....... *G02B 27/0018* (2013.01); *G02B 27/005* (2013.01); *H04N 5/33* (2013.01)

(58) Field of Classification Search
CPC .... H04N 5/33; G02B 27/0018; G02B 27/005; G02B 17/0621; G02B 13/14
See application file for complete search history.

(56) References Cited

U.S. PATENT DOCUMENTS

| | | | | |
|---|---|---|---|---|
| 10,088,681 | B2* | 10/2018 | Rolland | G02B 27/0176 |
| 2021/0033469 | A1* | 2/2021 | Wu | G01J 5/0806 |
| 2021/0373303 | A1* | 12/2021 | Zhang | G02B 17/0642 |

FOREIGN PATENT DOCUMENTS

CN  108732734  11/2018

* cited by examiner

*Primary Examiner* — Lin Ye
*Assistant Examiner* — John H Morehead, III
(74) *Attorney, Agent, or Firm* — ScienBiziP, P.C.

(57) ABSTRACT

The present application relates to an off-axis two-mirror infrared imaging system including a primary reflecting mirror and a secondary reflecting mirror. The primary reflecting mirror is located on the incident light path of an incident infrared light beam and reflects the incident infrared light beam to form a first reflected light beam. The secondary reflecting mirror is located on the reflection light path of the primary reflecting mirror, and is used to reflect the first reflected light beam to form a second reflected light beam. The second reflected light beam reaches an image surface after passing through the incident infrared light beam. The reflective surfaces of the primary reflecting mirror and the secondary reflecting mirror are freeform surfaces. The secondary reflecting mirror and the image plane are respectively located on both sides of the incident infrared light beam.

10 Claims, 2 Drawing Sheets

OFF-AXIS TWO-MIRROR INFRARED IMAGING SYSTEM

FIELD

The present application relates to a field of optical design, in particular to an off-axis two-mirror infrared imaging system.

BACKGROUND

The off-axis reflective optical imaging system has the advantages of high transmittance, wide imaging wavelength range, and no chromatic aberration, and has many applications in the imaging field. In order to avoid beam obstruction and reduce imaging efficiency, the symmetry of the off-axis system is destroyed, and some unconventional and field-dependent aberrations will be introduced. The spherical and aspherical surfaces with rotational symmetry are less capable of correcting such aberrations. The optical freeform surface is an optical surface with no rotational symmetry and high degrees of design freedom, which can be used to correct off-axis aberrations and improve optical performance. In recent years, more and more freeform surfaces have been used in off-axis reflective imaging systems, and many high-performance imaging systems have been realized.

At present, off-axis reflective system is increasingly used in infrared imaging, and has important applications in vehicle obstacle avoidance systems and surveillance security systems. For mid-to-long distance infrared imaging, the system often needs a larger focal length and a smaller F number. However, in order to avoid beam obstruction, the off-axis reflective optical system will cause the system to be too large when achieving a small F number.

Therefore, there is room for improvement in the art.

BRIEF DESCRIPTION OF THE DRAWINGS

Implementations of the present technology will now be described, by way of embodiments, with reference to the attached figures, wherein.

DETAILED DESCRIPTION

Figure 1:
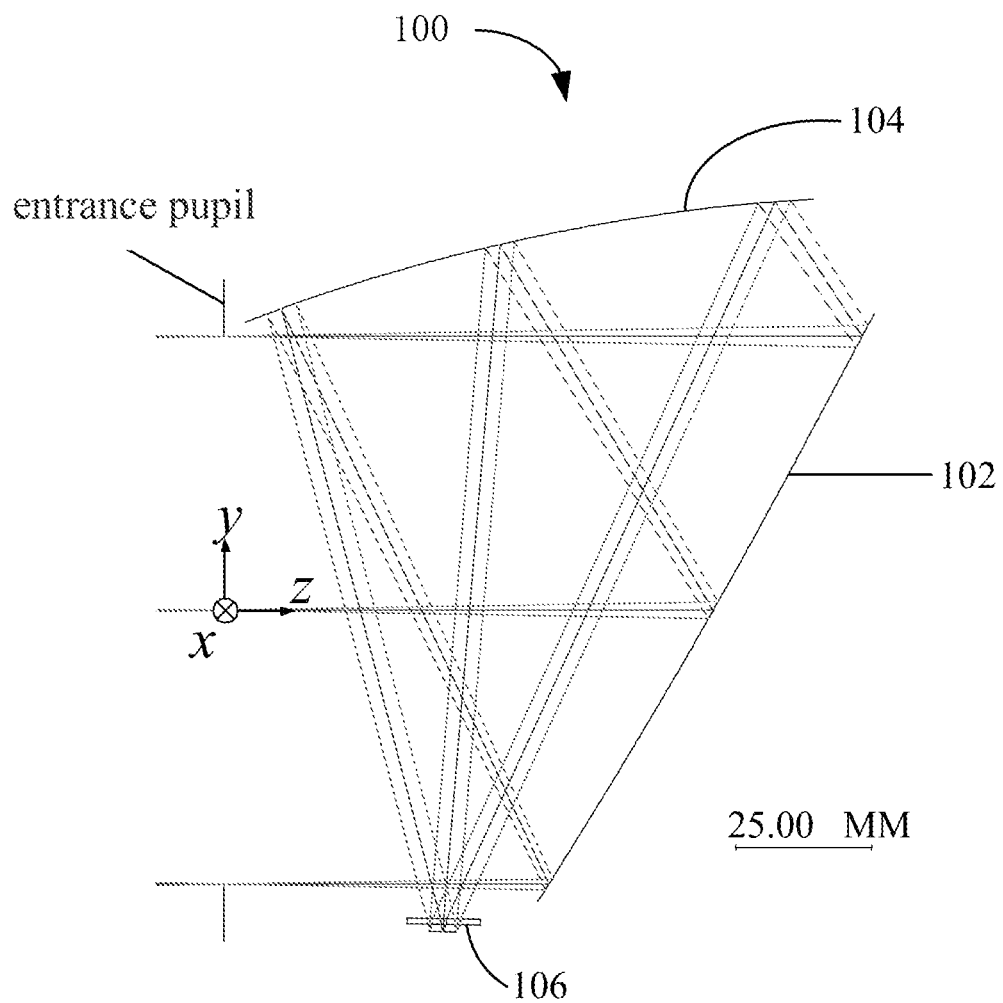
FIG. 1 shows a schematic view of an optical path of an off-axis two-mirror infrared imaging system of a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, an off-axis two-mirror infrared imaging system 100 is provided. The off-axis two-mirror infrared imaging system 100 includes a primary reflecting mirror 102, a secondary reflecting mirror 104, and an image plane 106 that are adjacently and spaced apart from each other. The primary reflecting mirror 102 is located on the incident light path of the incident infrared light beam and reflects the incident infrared light beam to form a first reflected light beam. The secondary reflecting mirror 104 is located on the reflected light path of the primary reflecting mirror 102 for reflecting the first reflected light beam, so that a second reflected light beam is formed. The image plane 106 is located on the reflection light path of the secondary reflecting mirror 104 and is used for receiving the second reflected light beam. The surface shapes of the reflective surfaces of the primary reflecting mirror 102 and the secondary reflecting mirror 104 are both freeform surfaces. The secondary reflecting mirror 104 and the image plane 106 are respectively located on both sides of the incident infrared light beam, and the incident infrared light beam is between the secondary reflecting mirror 104 and the image plane 106. The second reflected light beam reaches the image plane 106 after passing through the incident infrared light beam.

When the off-axis two-mirror infrared imaging system 100 works, the optical path is as follows: an object is located at infinity, and the infrared light beam emitted from the object first irradiates the reflective surface of the primary reflecting mirror 102 and is reflected by the primary reflecting mirror 102, to form the first reflected light beam. The first reflected light beam irradiates the reflective surface of the secondary reflecting mirror 104, and is reflected by the reflective surface of the secondary reflecting mirror 104 to form the second reflected light beam. Finally, the second reflected light beam reaches the image plane 106. The optical path of the second reflected beam crosses and partially overlaps the optical path of the incident infrared light beam, so that the space can be fully utilized and the volume of the system can be reduced.

For the convenience of description, the space where the off-axis two-infrared imaging system 100 is located is defined as a global three-dimensional rectangular coordinate system (X, Y, Z), the space where the primary reflecting mirror 102 is located is defined as a first local three-dimensional rectangular coordinate system (X', Y', Z'), and the space where the secondary reflecting mirror 104 is located is defined as a second local three-dimensional rectangular coordinate system (X", Y", Z"). In one embodiment, the center of the entrance pupil position of the off-axis dual-reflective imaging system 100 is the origin of the global three-dimensional rectangular coordinate system. Referring to FIG. 1, a horizontal straight line passing through the center of the entrance pupil is Z axis, leftward is negative and rightward is positive; the Y axis is in the plane shown in FIG. 1, the Y axis is perpendicular to the Z axis, and upward is positive and downward is negative; and the X axis is perpendicular to the YZ plane, and inward is positive and outward is negative.

In the global three-dimensional rectangular coordinate system (X, Y, Z), the first local three-dimensional rectangular coordinate system (X', Y', Z') is defined with a point on the primary reflecting mirror 102 as the origin, and the reflective surface and the position of the primary reflecting mirror 102 are described by the first local three-dimensional rectangular coordinate system (X', Y', Z'). In the global three-dimensional rectangular coordinate system (X, Y, Z), the second local three-dimensional rectangular coordinate system (X", Y", Z" is defined with a point on the secondary reflecting mirror 104 as the origin), and the reflective surface and the position of the secondary reflecting mirror 104 are described by the second local three-dimensional rectangular coordinate system (X", Y", Z").

The origins of the first local three-dimensional rectangular coordinate system (X', Y', Z') and the second local three-dimensional rectangular coordinate system (X", Y", Z") are respectively located at different positions of the global three-dimensional rectangular coordinate system (X, Y, Z). Each of the first local three-dimensional rectangular coordinate system (X', Y', Z') and the second three-dimensional rectangular coordinate system (X", Y", Z") can be formed by first translating the global three-dimensional rectangular coordinate system (X, Y, Z) to make the origin of the global three-dimensional rectangular coordinate system (X, Y, Z) coincide with the origin of the local three-dimensional rectangular coordinate system, and then rotating around the X axis of the global three-dimensional rectangular coordinate system (X, Y, Z).

The first local three-dimensional rectangular coordinate system (X', Y', Z') is obtained by translating the global three-dimensional rectangular coordinate system (X, Y, Z) along the negative direction of the Y axis and the positive direction of the Z axis, and the translation distance can be selected according to actual needs. In one embodiment, the first local three-dimensional rectangular coordinate system (X', Y', Z') is obtained by translating the global three-dimensional rectangular coordinate system (X, Y, Z) along the negative direction of the Y-axis about 35 mm (millimeter), and then translating the global three-dimensional rectangular coordinate system (X, Y, Z) along the positive direction of the Z axis about 75 mm. The coordinates of the origin of the first local three-dimensional rectangular coordinate system in the global three-dimensional rectangular coordinate system are (0, −35, 75).

In the first local three-dimensional rectangular coordinate system (X', Y', Z'), the reflective surface of the primary reflecting mirror 102 is a polynomial freeform surface of x'y', and the equation of the x'y' polynomial freeform surface can be represented as:

$$z'(x', y') = \frac{c'(x'^2 + y'^2)}{1 + \sqrt{1 - (1 + k')c'^2(x'^2 + y'^2)}} + \sum_{i=1}^{N} A'_i x'^m y'^n,$$

wherein z' represents the height of the surface vector, c' represents the curvature of the surface, k' represents the coefficient of the quadric surface, and Ai' represents the coefficient of the i-th term in the polynomial. Since the off-axis two-mirror infrared imaging system 100 is symmetrical about the YZ plane, only the even-order terms of X can be retained. In one embodiment, the reflective surface of the primary reflecting mirror 102 is an x'y' polynomial freeform surface with an even-order term of x' of degree 7 and the equation of the x'y' polynomial freeform surface can be represented as:

$$z'(x', y') = \frac{c'(x'^2 + y'^2)}{1 + \sqrt{1 - (1 + k')c'^2(x'^2 + y'^2)}} + A'_3 y' +$$
$$A'_4 x'^2 + A'_6 y'^2 + A'_8 x'^2 y' + A'_{10} y'^3 + A'_{11} x'^4 + A'_{13} x'^2 y'^2 +$$
$$A'_{15} y'^4 + A'_{17} x'^4 y' + A'_{19} x'^2 y'^3 + A'_{21} y'^5 + A'_{22} x'^6 + A'_{24} x'^4 y'^2 +$$
$$A'_{26} x'^2 y'^4 + A'_{28} y'^6 + A'_{30} x'^6 y' + A'_{32} x'^4 y'^3 + A'_{34} x'^2 y'^5 + A'_{36} y'^7.$$

It should be noted that the highest degree of the x'y' polynomial freeform surface is not limited to the 7th degree, and can also be 4th, 5th, 6th, 8th, 10th, etc. The highest degree of the x'y' polynomial freeform surface can be selected according to need.

In one embodiment, please refer to Table 1 for the values of curvature c', quadric coefficient k', and various coefficients Ai' in the x'y' polynomial of the reflective surface of the primary reflecting mirror 102. It can be understood that the values of the curvature c', the quadric surface coefficient k', and the various coefficients Ai' are not limited to those described in Table 1, and those skilled in the art can adjust them according to actual needs.

TABLE 1

| values of the coefficients in the x'y' polynomial of the reflective surface of the primary reflecting mirror 102 | |
| --- | --- |
| c' | 0.322E−03 |
| k' | 20.941 |
| A$_3$' | 3.214 |
| A$_4$' | −0.618E−03 |
| A$_6$' | −2.519E−03 |
| A$_8$' | −1.491E−06 |
| A$_{10}$' | −0.181E−06 |
| A$_{11}$' | −2.829E−09 |
| A$_{13}$' | −6.741E−09 |
| A$_{15}$' | −2.357E−09 |
| A$_{17}$' | 0.687E−10 |
| A$_{19}$' | 2.839E−10 |
| A$_{21}$' | 1.176E−10 |
| A$_{22}$' | −5.066E−13 |
| A$_{24}$' | −5.850E−12 |
| A$_{26}$' | −2.447E−12 |
| A$_{28}$' | −1.239E−12 |
| A$_{30}$' | −2.352E−14 |
| A$_{32}$' | 9.761E−15 |
| A$_{34}$' | 2.014E−14 |
| A$_{36}$' | 1.414E−14 |

In the global three-dimensional rectangular coordinate system (X, Y, Z), the second local three-dimensional rectangular coordinate system (X", Y", Z") is obtained by translating the first local three-dimensional rectangular coordinate system (X', Y', Z') along the positive direction of the Y axis and the negative direction of the Z axis, and the translation distance can be selected according to actual needs. In one embodiment, the second local three-dimensional rectangular coordinate system (X", Y", Z") is obtained by translating the first local three-dimensional rectangular coordinate system (X', Y', Z') along the positive direction of the Y axis about 94 mm, and then translating the first local three-dimensional rectangular coordinate system (X', Y', Z') along the negative direction of the Z axis about 33 mm, and finally rotating 100 degrees counterclockwise with the X' axis as the rotation axis. The coordinates of the origin of the second local three-dimensional rectangular coordinate system in the global three-dimensional rectangular are (0, 59, 42).

In the second local three-dimensional rectangular coordinate system (X", Y", Z"), the reflective surface of the secondary reflecting mirror 104 is a polynomial freeform surface of x"y", and the equation of the x"y" polynomial freeform surface can be represented as:

$$z''(x'', y'') = \frac{c''(x''^2 + y''^2)}{1 + \sqrt{1 - (1 + k'')c''^2(x''^2 + y''^2)}} + \sum_{i=1}^{N} A_i'' x''^m y''^n,$$

wherein z" represents the height of the surface vector, c" represents the curvature of the surface, k" represents the quadric surface coefficient, and Ai" represents the coefficient of the i-th term in the polynomial. Since the off-axis two-mirror infrared imaging system 100 is symmetrical about the Y"Z" plane, only the even-order terms of X" can be retained. In one embodiment, the reflective surface of the secondary reflecting mirror 104 is an x"y" polynomial freeform surface with an even-order term of X" of degree 8; and the equation of the x"y" polynomial freeform surface can be represented as:

$$z''(z'', y'') = \frac{c''(x''^2 + y''^2)}{1 + \sqrt{1 - (1 + k'')c''^2(x''^2 + y''^2)}} + A_3'' y'' + A_4'' x''^2 +$$
$$A_6'' y''^2 + A_8'' x''^2 y'' + A_{10}'' y''^3 + A_{11}'' x''^4 + A_{13}'' x''^2 y''^2 + A_{15}'' y''^4 +$$
$$A_{17}'' x''^4 y'' + A_{19}'' x''^2 y''^3 + A_{21}'' y''^5 + A_{22}'' x''^6 + A_{24}'' x''^4 y''^2 +$$
$$A_{26}'' x''^2 y''^4 + A_{28}'' y''^6 + A_{30}'' x''^6 y'' + A_{32}'' x''^4 y''^3 + A_{34}'' x''^2 y''^5 +$$
$$A_{36}'' y''^7 + A_{37}'' x''^8 + A_{39}'' x''^6 y''^2 + A_{41}'' x''^4 y''^4 + A_{43}'' x''^2 y''^6 + A_{45}'' y''^8.$$

It should be noted that the highest degree of the x"y" polynomial freeform surface is not limited to the 8th degree, and can also be 4th, 5th, 6th, 7th, 10th, etc. One skilled in the art can optimize the design according to the actual situation.

In one embodiment, referring to Table 2 for the values of the curvature c", the quadric surface coefficient k" and the various coefficients Ai" in the x"y" polynomial of the reflective surface of the secondary reflecting mirror 104. It can be understood that the values of the curvature c", the quadric surface coefficient k", and the various coefficients Ai" are not limited to those described in Table 2, and one skilled in the art can adjust them according to actual needs.

TABLE 2

| the value of each coefficient in the x"y" polynomial of the reflective surface of the secondary reflecting mirror 104 | |
|---|---|
| c" | −1.670E−03 |
| k" | 36.234 |
| $A_3''$ | −1.109 |
| $A_4''$ | −5.044E−04 |
| $A_6''$ | −8.106E−04 |

TABLE 2-continued

| the value of each coefficient in the x"y" polynomial of the reflective surface of the secondary reflecting mirror 104 | |
|---|---|
| $A_8''$ | −4.466E−06 |
| $A_{10}''$ | −5.927E−06 |
| $A_{11}''$ | −3.167E−09 |
| $A_{13}''$ | −0.917E−08 |
| $A_{15}''$ | −2.097E−08 |
| $A_{17}''$ | 3.771E−10 |
| $A_{19}''$ | 8.039E−11 |
| $A_{21}''$ | −0.569E−11 |
| $A_{22}''$ | 3.983E−12 |
| $A_{24}''$ | 7.944E−12 |
| $A_{26}''$ | 7.912E−12 |
| $A_{28}''$ | 2.305E−12 |
| $A_{30}''$ | −4.284E−14 |
| $A_{32}''$ | 5.179E−14 |
| $A_{34}''$ | 6.282E−14 |
| $A_{36}''$ | 5.568E−14 |
| $A_{37}''$ | −1.054E−16 |
| $A_{39}''$ | −6.732E−16 |
| $A_{41}''$ | 9.577E−16 |
| $A_{43}''$ | 7.674E−16 |
| $A_{45}''$ | 5.732E−16 |

The materials of the primary reflecting mirror 102 and the secondary reflecting mirror 104 are not limited, as long as the primary reflecting mirror 102 and the secondary reflecting mirror 104 have a high reflectivity. The materials of the primary reflecting mirror 102 and the secondary reflecting mirror 104 can be metal, such as aluminum and copper. The materials of the primary reflecting mirror 102 and the secondary reflecting mirror 104 can be inorganic non-metallic, such as silicon carbide and silicon dioxide. In order to further increase the reflectivity of the primary reflecting mirror 102 and the secondary reflecting mirror 104, a reflection enhancement film can be plated on the reflection surface of the primary reflecting mirror 102, and a reflection enhancement film can be plated on the reflection surface of the secondary reflecting mirror 104. The reflection enhancement film can be a gold film. The size of the primary reflecting mirror 102 and the secondary reflecting mirror 104 is not limited.

The infrared light incident is reflected by the primary reflecting mirror 102 and reaches the secondary reflecting mirror 104, and then is reflected by the secondary reflecting mirror 104 to reach the image plane 106. The infrared light is finally received by the image plane 106 and imaged. In the global three-dimensional rectangular coordinate system (X, Y, Z), the image plane 106 deviates from the secondary reflecting mirror 104 along the negative direction of the Y axis, and the deviation amount can be selected according to actual needs. In one embodiment, in the global three-dimensional rectangular coordinate system (X, Y, Z), the image plane 106 deviates from the secondary reflecting mirror 104 along the negative direction of the Y axis, and the deviation amount is 112 mm. The distance between the center of the image plane 106 and the origin of the second local three-dimensional rectangular coordinate system where the secondary reflecting mirror 104 is located along the negative direction of the Y axis is about 112 mm. The image plane 106 deviates from the secondary reflecting mirror 104 along the positive direction of the Z axis, and the deviation amount is 1.5 mm. The distance between the center of the image plane 106 and the origin of the second local three-dimensional rectangular coordinate system where the secondary reflecting mirror 104 is located along the negative direction of the Z-axis is about 1.5 mm. The angle between the image plane 106 and the X"Y" plane along the clockwise direction is about 1 degree, and the coordinates of the center of the image plane 106 in the global three-dimensional rectangular coordinate system (X, Y, Z) are (0, −53, 43.5). Any optical imaging element can be located at the position of the image plane 106, and the position of the image plane 106 can also be used as the entrance pupil of another optical system. In one embodiment, an infrared light detector is located on the image plane 106.

In addition, the off-axis two-mirror infrared imaging system 100 can further include an aperture stop (AS). The position of the aperture stop is not limited; and the aperture stop can be located at the entrance pupil, on the primary reflecting mirror 102, on the secondary reflecting mirror 104, or on the image plane 106. The aperture stop can also be located on the incident light path of the incident light beam, the reflected light path of the primary reflecting mirror 102, or the reflected light path of the secondary reflecting mirror 104. The aperture and shape of the aperture stop are not limited, and can be selected according to actual needs. In one embodiment, the aperture stop is located on the secondary reflecting mirror 104, the aperture stop 108 is circular, and the outer edge of the aperture stop 108 coincides with the outer edge of the secondary reflecting mirror 104.

The field angle, equivalent focal length, F-number and other parameters of the off-axis two-mirror infrared imaging system 100 can be set according to actual conditions. The angle of view of the off-axis two-mirror infrared imaging system 100 can be in a range from 2°×1.5° to 3.2°×2.4°. In one embodiment, the field of view of the off-axis two-mirror infrared imaging system 100 is 2.6°×1.95°. The equivalent focal length of the off-axis two-mirror infrared imaging system 100 can be in a range from 120 mm to 160 mm. The F-number of the off-axis two-mirror infrared imaging system 100 is in a range from 1.4 to 2.0. In one embodiment, the F-number of the off-axis two-mirror infrared imaging system 100 is 1.5. The relative aperture D/f represents the reciprocal of the F-number, and the relative aperture D/f of the off-axis two-mirror infrared imaging system 100 is 0.667. It is understand that the values of the parameters of the off-axis two-mirror infrared imaging system 100 are not limited to the values listed in above embodiments, and other values of the parameters obtained according to the present application should also fall within the protection scope of the present application.

The working wavelength band of the off-axis two-mirror infrared imaging system 100 can be long-wave infrared. In one embodiment, the working wavelength can be in a range from 8 micrometers to 12 micrometers. The working wavelength of the off-axis two-infrared imaging system 100 is not limited to this embodiment, and can be adjusted according to actual needs.

Figure 2:
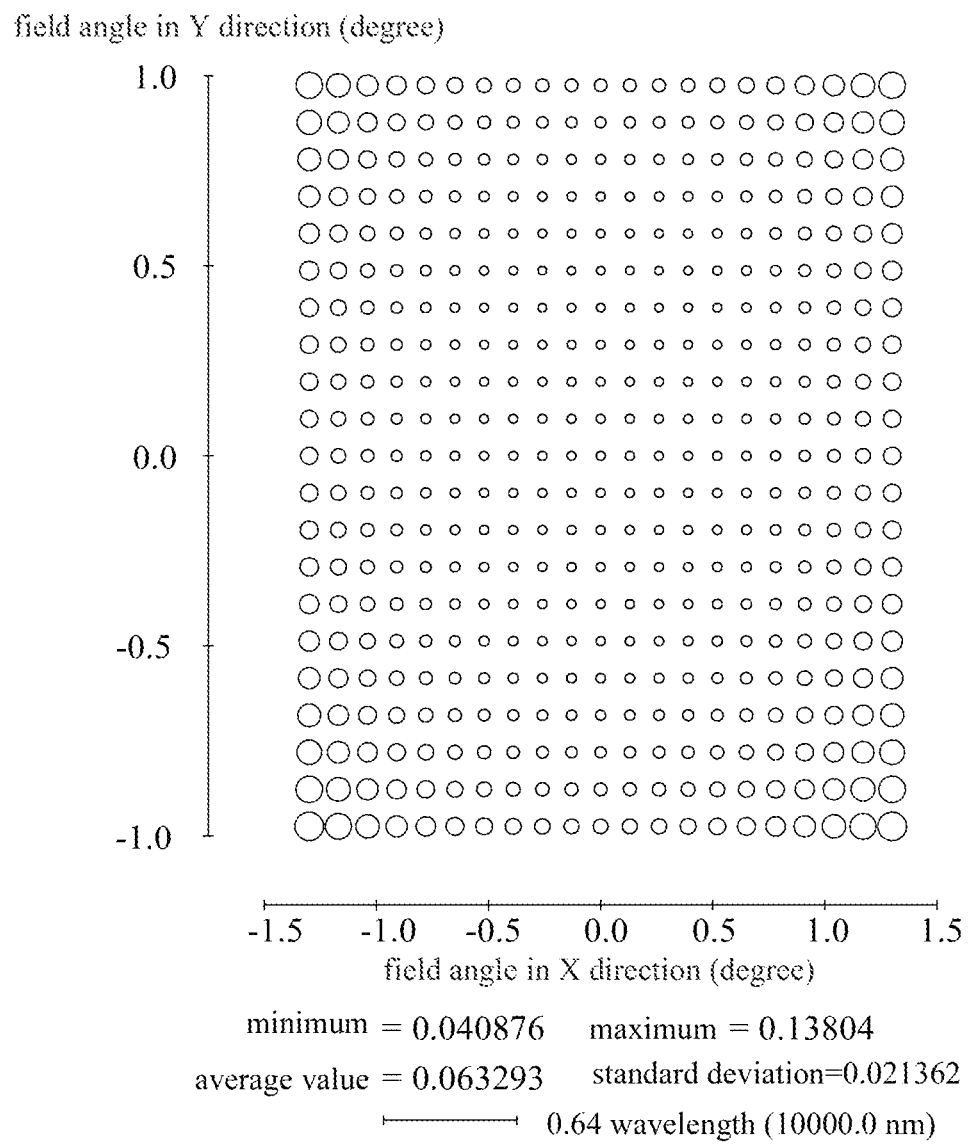
FIG. 2 shows average RMS wave-front aberrations of each field of view of the off-axis two-mirror infrared imaging system of the first embodiment.

FIG. 2 shows average RMS wave-front aberrations of each field of view of the off-axis two-mirror infrared imaging system 100. In FIG. 2, the average value is 0.063λ, wherein λ=10000.0 nm, indicating that the image quality of the off-axis two-mirror infrared imaging system 100 is very good.

The off-axis two-mirror infrared imaging system 100 provided by the present application has the following advantages: first, the off-axis two-mirror infrared imaging system 100 adopts an off-axis two-mirror system, and only uses two reflecting mirrors, thus, the structure of the off-axis two-mirror infrared imaging system 100 is compact, thereby reducing the volume and weight of the off-axis two-mirror infrared imaging system 100; second, the off-axis two-mirror infrared imaging system 100 has a simple structure and is easy to design and process, and easy to mass production; third, the F-number of the off-axis two-mirror infrared imaging system 100 is small, and is in the range from 1.4 to 2.0, and the relative aperture is relatively large, which can allow more light to enter the off-axis two-mirror infrared imaging system 100, so that the off-axis two-mirror infrared imaging system 100 has a higher input energy and limit resolution; fourth, the off-axis two-mirror infrared imaging system 100 has a focal length of up to 150 mm, which can achieve medium and long-distance observations while obtaining high-resolution images.

The application field of the off-axis two-mirror infrared imaging system 100 provided by the present application relates to earth observation, space target detection, astronomical observation, multi-spectral thermal imaging, stereo surveying and mapping, aerospace, unmanned driving and the like. The off-axis two-mirror infrared imaging system 100 provided by the present application has reached the diffraction limit in the infrared band, and can be used in visible light or in the infrared band.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. An off-axis two-mirror infrared imaging system, comprising:
   a primary reflecting mirror located on an incident light path of an incident infrared light beam, wherein the primary reflecting mirror reflects the incident infrared light beam to form a first reflected light beam; and
   a secondary reflecting mirror located on an reflection light path of the primary reflecting mirror, wherein the primary reflecting mirror reflects the first reflected light beam to form a second reflected light beam, and the second reflected light beam reaches an image surface after passing through the incident infrared light beam;
   wherein a space where the off-axis two-mirror infrared imaging system is located is defined as a global three-dimensional rectangular coordinate system (X, Y, Z), a space where the primary reflecting mirror is located is defined as a first local three-dimensional rectangular coordinate system (X', Y', Z'), a space where the secondary reflecting mirror is located is defined as a second local three-dimensional rectangular coordinate system (X", Y", Z"); the first local three-dimensional rectangular coordinate system (X', Y', Z') are obtained by translating the global three-dimensional rectangular coordinate system (X, Y, Z) along a negative direction of a Y axis and a positive direction of a Z axis, and the second local three-dimensional rectangular coordinate system (X", Y", Z") is obtained by translating the first local three-dimensional rectangular coordinate system (X', Y', Z') along the positive direction of the Y axis and the negative direction of the Z axis; reflective surfaces of the primary reflecting mirror and the secondary reflection are freeform surfaces; the secondary reflecting mirror and the image surface are respectively located on both sides of the incident infrared light beam, so that the incident infrared light beam is between the secondary reflecting mirror and the image surface; and a focal length of the off-axis two-mirror infrared imaging system is in a range from 120 mm to 160 mm, and F number of the off-axis two-mirror infrared imaging system is in a range from 1.4 to 2.0.

2. The off-axis two-mirror infrared imaging system of claim 1, wherein the primary reflecting mirror and an entrance pupil are respectively located on both sides of the second reflected light beam, so that the second reflected light beam is between the primary reflecting mirror and an entrance pupil.

3. The off-axis two-mirror infrared imaging system of claim 1, wherein an optical path of the second reflected light beam crosses and partially overlaps the incident light path of the incident infrared light beam.

4. The off-axis two-mirror infrared imaging system of claim 1, wherein in the global three-dimensional rectangular coordinate system (X, Y, Z), the image plane deviates from the secondary reflecting mirror along the negative direction of the Y axis.

5. The off-axis two-mirror infrared imaging system of claim 1, wherein in the first local three-dimensional rectangular coordinate system (X', Y', Z'), the reflection surface of the primary reflecting mirror is the freeform surface of x'y' polynomial, and a degree of the x'y' polynomial is 7th, and an equation of the x'y' polynomial is represented as:

$$z'(x', y') = \frac{c'(x'^2 + y'^2)}{1 + \sqrt{1-(1+k')c'^2(x'^2 + y'^2)}} + A'_3 y' +$$
$$A'_4 x'^2 + A'_6 y'^2 + A'_8 x'^2 y' + A'_{10} y'^3 + A'_{11} x'^4 + A'_{13} x'^2 y'^2 +$$
$$A'_{15} y'^4 + A'_{17} x'^4 y' + A'_{19} x'^2 y'^3 + A'_{21} y'^5 + A'_{22} x'^6 + A'_{24} x'^4 y'^2 +$$
$$A'_{26} x'^2 y'^4 + A'_{28} y'^6 + A'_{30} x'^6 y' + A'_{32} x'^4 y'^3 + A'_{34} x'^2 y'^5 + A'_{36} y'^7.$$

wherein z' represents a surface vector height, c' represents a surface curvature, k' represents a quadric surface coefficient, and Ai' represents a coefficient of i-th term in the x'y' polynomial.

6. The off-axis two-mirror infrared imaging system of claim 5, wherein the surface curvature c'=0.322E-03, the quadric surface coefficient is 20.941, and the coefficient of i-th term is A3'=3.214, A4'=−0.618E-03, A6'=−2.519E-03, A8'=−1.491E-06, A10'=−0.181E-06, A11'=−2.829E-09, A13'=−6.741E-09, A15'=−2.357E-09, A17'=0.687E-10, A19'=2.839E-10, A21'=1.176E-10, A22'=−5.066E-13, A24'=−5.850E-12, A26'=−2.447E-12, A28'=−1.239E-12, A30'=−2.352E-14, A32'=9.761E-15, A34'=2.014E-14, and A36'=1.414E-14.

7. The off-axis two-mirror infrared imaging system of claim 1, wherein the reflective surface of the secondary reflecting mirror is the freeform surface of x"y" polynomial, and a degree of the x"y" polynomial is 8, and an equation of the x"y" polynomial is represented as:

$$z''(z'', y'') = \frac{c''(x''^2 + y''^2)}{1 + \sqrt{1-(1+k'')c''^2(x''^2 + y''^2)}} + A''_3 y'' + A''_4 x''^2 +$$
$$A''_6 y''^2 + A''_8 x''^2 y'' + A''_{10} y''^3 + A''_{11} x''^4 + A''_{13} x''^2 y''^2 + A''_{15} y''^4 +$$
$$A''_{17} x''^4 y'' + A''_{19} x''^2 y''^3 + A''_{21} y''^5 + A''_{22} x''^6 + A''_{24} x''^4 y''^2 +$$
$$A''_{26} x''^2 y''^4 + A''_{28} y''^6 + A''_{30} x''^6 y'' + A''_{32} x''^4 y''^3 + A''_{34} x''^2 y''^5 +$$
$$A''_{36} y''^7 + A''_{37} x''^8 + A''_{39} x''^6 y''^2 + A''_{41} x''^4 y''^4 + A''_{43} x''^2 y''^6 + A''_{45} y''^8.$$

wherein z" represents a surface vector height, c" represents a surface curvature, k" represents a quadric surface coefficient, and Ai" represents a coefficient of i-th term in the x"y" polynomial.

8. The off-axis two-mirror infrared imaging system of claim 7, wherein the surface curvature c"=−1.670E-03, the quadric surface coefficient k"=36.234, and the coefficients of i-th term is A3"=−1.109, A4"=−5.044E-04, A6"=−8.106E-04, A8"=−4.466E-06, A10"=−5.927E-06, A11"=−3.167E-09, A13"=−0.917E-08, A15"=−2.097E-08, A17"=3.771E-10, A19"=8.039E-11, A21"=−0.569E-11, A22"=3.983E-12, A24"=7.944E-12, A26"=7.912E-12, A28"=2.305E-12, A30"=−4.284E-14, A32"=5.179E-14, A34"=6.282E-14, A36"=5.568E-14, A37"=−1.054E-16, A39"=−6.732E-16, A41"=9.577E-16, A43"=7.674E-16, and A45"=5.732E-16.

9. The off-axis two-mirror infrared imaging system of claim 1, wherein a field of view of the off-axis two-mirror infrared imaging system is in a range from 2°×1.5° to 3.2°×2.4°.

10. The off-axis two-mirror infrared imaging system of claim 9, wherein the field of view of the off-axis two-mirror infrared imaging system is 2.6°×1.95°.

\* \* \* \* \*